J. H. PRICE.
AUTOMOBILE LOCK.
APPLICATION FILED MAR. 13, 1920.
1,377,157.
Patented May 3, 1921.
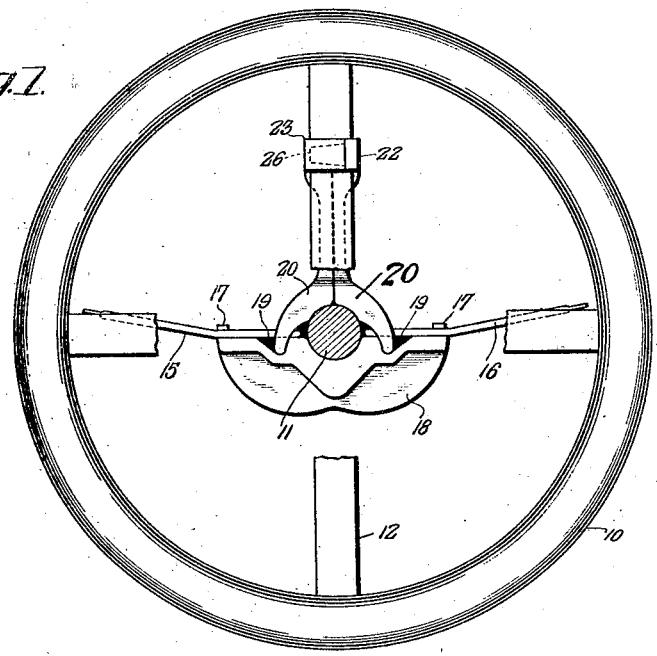
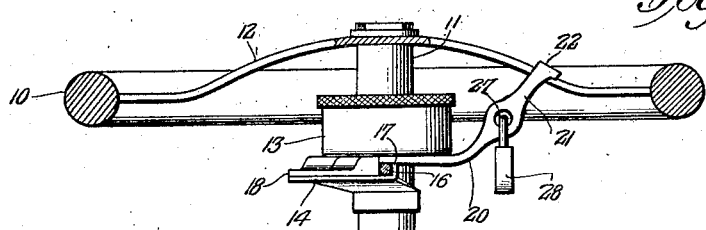
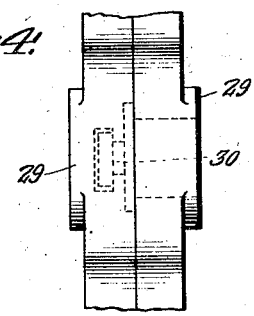
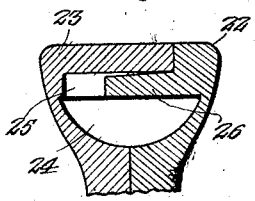
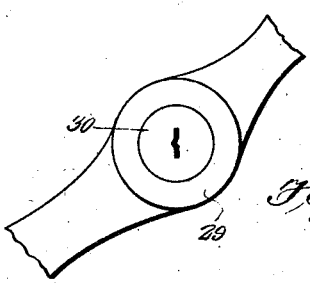
Witnesses
Inventor
J.H. Price,
By Munn &Co.
Attorney

UNITED STATES PATENT OFFICE.

JOSEPH H. PRICE, OF CAPE GIRARDEAU, MISSOURI.

AUTOMOBILE-LOCK.

1,377,157.  Specification of Letters Patent.  Patented May 3, 1921.

Application filed March 13, 1920. Serial No. 365,604.

*To all whom it may concern:*

Be it known that I, JOSEPH H. PRICE, a citizen of the United States, and a resident of Cape Girardeau, in the county of Cape Girardeau and State of Missouri, have invented certain new and useful Improvements in Automobile-Locks, of which the following is a specification.

My present invention relates generally to auto locks, and more particularly to locks for Ford automobiles of the nature described and claimed in my application Serial No. 340,126, filed in the United States Patent Office under date of November 24, 1919, the object of my present improvements being the provision of a novel addition, in the nature of a steering wheel lock, in connection with the spark and throttle lever locking means of my application just referred to.

More especially my invention aims to provide the movable locking arms of my application above referred to with extensions engageable with one of the radial ribs or spokes of the steering wheel so that when these arms are locked the steering wheel will be securely held against rotative movement in addition to the locking of the spark and throttle levers, from the bearing against which my invention derives its source holding power as applied to the steering wheel.

In the accompanying drawing illustrating my present invention,

Figure 1 is a sectional top plan view illustrating the practical application of my invention, Fig. 2 is a sectional side elevation showing the same, Fig. 3 is a detail transverse section through the spoke engaging ends of the clamping arms, Fig. 4 is a detail plan view illustrating a slightly modified form, and Fig. 5 is a side view of Fig. 4.

Referring now to these figures I have shown the steering wheel and steering post of a Ford automobile respectively at 10 and 11, the former as usual including a series of radial ribs or spokes 12 which radiate from the upper end of the post 11. The usual gear casing is indicated at 13 on the steering post, spaced below which is the quadrant 14 on which the spark and throttle levers 15 and 16 operate. The forward opposite sides of the quadrant 14 have usual upturned lugs 17 against which the levers 15 and 16 abut when in the inactive position.

As in my application above referred to, my invention includes a lock plate 18 of somewhat the shape of the quadrant 14 and arranged to seat on the quadrant with the opposite side portions of its forward edge abutting the two levers 15 and 16 when the latter are in inactive positions indicated in Fig. 1 against the quadrant lugs 17 so as to thus oppose movement of either of the levers. This lock plate 18 has upper recesses 19 in which the inner portions of a pair of locking arms 20 are swingable. The ends of these arms have angular extremities extending vertically through the lock plate and forming pivots on which the arms are swingable so that they may be shifted into the position shown in Fig. 1 with their inner portions snugly engaging the forward portion of the steering post opposite to the lock plate 18 and immediately below the lower forward portion of the gear casing 13. My former application referred to contemplated the locking of the arms which, terminated at the point of locking, at the lower forward portion of the gear casing while my present improvement proposes the provision of extensions 21 projecting upwardly at the forward portion of the gear casing and the provision of undercut angular heads 22 and 23 at the outer ends of the arm extensions adapted to embrace one of the spokes or radial ribs 12 of the steering wheel, the undercut portions of these heads when together forming a recess as seen at 24 in Fig. 3 which receives the steering wheel spoke or rib. Moreover, and in order to prevent spreading of the steering wheel engaging heads by an implement applied between the same and the steering wheel spoke engaged thereby, I preferably provide the lower inner surface of the head 23 with a transverse slot 25, the head 22 having an extending tongue 26 which enters said recess.

For the purpose of locking the arms, their extensions 21 may have transverse registering openings 27 at points intermediate their ends, for the reception of a pad lock 28, or, instead of the pad lock receiving apertures, the arms may be provided with enlargements 29 as indicated in Figs. 4 and 5 adapted to contain any suitable form of barrel or key controlled self contained lock structure as indicated at 30.

I claim:

The combination with a steering post, steering wheel, control levers, and quadrant on which the levers work, of a lock plate seated on the quadrant and opposing and abutting the levers in their inactive positions, relatively swingable steering post embracing arms pivotally connected to the lock plate, means for locking the said arms around the steering post, and extensions carried by the said arms, having undercut angular terminal heads for embracing engagement with one of the spokes of the steering wheel, said spoke engaging heads having inner relatively engaging tongue and grooved portions for the purpose described.

JOSEPH H. PRICE.